United States Patent [19]
Harbert et al.

[11] 4,122,974
[45] Oct. 31, 1978

[54] VARIABLE SPEED PLANTER SEED DRIVE

[75] Inventors: Jimmy D. Harbert, Coal Valley; Harold V. Hansen, Cordova, both of Ill.

[73] Assignee: Deere & Company, Moline, Ill.

[21] Appl. No.: 825,367

[22] Filed: Aug. 17, 1977

Related U.S. Application Data

[63] Continuation-in-part of Ser. No. 677,811, Apr. 16, 1976, abandoned.

[51] Int. Cl.$^2$ .............................................. G07F 11/00
[52] U.S. Cl. ...................... 221/13; 221/185; 222/615; 222/616; 222/623; 74/230.17 A; 111/1
[58] Field of Search ................ 221/13, 185; 222/614, 222/615, 616, 623; 111/1, 34, 36; 74/230.17 A

[56] References Cited

U.S. PATENT DOCUMENTS

| | | | |
|---|---|---|---|
| 2,577,913 | 12/1951 | Peterson | 74/230.17 A |
| 3,063,599 | 11/1962 | Kestel | 222/614 |
| 3,202,323 | 8/1965 | Powell | 222/615 |
| 3,581,950 | 6/1971 | Miller | 222/615 |
| 3,855,953 | 12/1974 | Fathauer | 111/1 |
| 3,912,121 | 10/1975 | Steffen | 221/13 |
| 3,954,018 | 5/1976 | O'Berto | 74/230.17 A |

*Primary Examiner*—Allen N. Knowles

[57] ABSTRACT

An electrically adjusted and mechanically driven variable speed pulley transmission provides immediate and accurate changes to the seed dispensing rate of a planter. The variable speed pulley transmission is driven by a ground-engaging wheel and adjusted in response to electrically monitored variations between desired and actual seed plant densities. Adjustment to the sheaves of the transmission pulley is effected by an electric motor and tension springs which interconnect the movable pulley sheaves apply pressure to the sides of the pulley belt to assure torque transmission at low RPM's.

14 Claims, 4 Drawing Figures

VARIABLE SPEED PLANTER SEED DRIVE

CROSS REFERENCE TO RELATED APPLICATION

This application is a continuation-in-part of U.S. application Ser. No. 677,811 filed on Apr. 16, 1976, now abandoned.

BACKGROUND OF THE INVENTION

This invention relates generally to agricultural planters which provide means for monitoring the density of seeds planted, and then automatically adjust the seed dispensing drive in response to variations between the monitored seed density and a desired seed density to maintain the desired seed density. More specifically, there is provided herein an improved means for variably driving the seed dispensing means to assure that the actual number of seeds planted corresponds with the desired seed density.

Recent developments in farming techniques include the use of controlled population planters which automatically monitor the seeds dispensed, compare that number of seeds dispensed to a desired seed dispense rate or density and make changes in the number of seeds dispensed to achieve the desired density of seeds planted. See for example U.S. Pat. No. 3,912,121 issued Oct. 14, 1975 to Steffen wherein such a population control device is adapted to an agricultural planter. However, the planter population control devices available to date utilize hydraulic variable speed seed dispensing drive means. These planters utilize hydraulic motors to either directly power the seed dispensing drives or to provide the torque required to accurately drive the seed dispensing drives at the low RPM's encountered in planting operations. These hydraulic motors are in turn powered by a hydraulic pump which utilizes a servo valve to control the operation of the motor. The motor speed and thus the seed dispensing rate are changed through adjusting the servo valve in response to an appropriate signal received from the population control device. When this type of seed meter drive is adjusted to increase or decrease the seed dispensing rate, the motor often oscillates or else is delayed in responding to the servo valve action. Accordingly, the servo valve and hydraulic motor driving the seed dispensing means do not provide an immediate and accurate change to the seed dispensing rate as is dictated by the population control device. This lag in attainment of desired seed dispense rate is generally encountered as adjustments are made to the planting rate or during the start up at each end of the field.

A further problem can be encountered with the servo valve control due to contaminated hydraulic fluid. Servo valves are sensitive to the small amounts of contamination which can enter the hydraulic system during connection and disconnection of the hydraulic lines. The accuracy with which fine adjustments must be made to the hydraulic motor speed can be lost if such contamination enters the fluid lines. These problems become of concern when small or immediate changes in seed dispensing rate are desired, as for example, when the farmer passes between loam-type soils and sandy soils in which different seed populations are desired.

Therefore, it would be desirable to utilize a mechanical transmission in place of the hydraulic transmission now available with population control devices. However, available mechanical pulley transmissions which can be driven at low RPM's by ground-engaging wheels are not capable of maintaining torque transmission over the full range of pulley speed variation to assure precise seed meter speed changes.

SUMMARY OF THE INVENTION

Accordingly, it is an object of the present invention to provide a new and improved controlled population planter capable of dependably making immediate and precise changes to the seed dispensing rate to correct significant variations between the actual density of seeds dispensed and the density of seeds desired.

It is further an object to provide a variable speed transmission in combination with a controlled population device and mechanically coupled with the planter to drive the seed dispensing meters at the desired rate immediately upon movement of the planter across the ground. The transmission should further be simple and economically operable in the contaminated environment common to agricultural planters. More specifically, it is an object to provide a variable speed pulley transmission capable of transmitting torque over the full range of seed meter operating speeds common to agricultural planters. The pulley belt should be provided with a substantially constant side pressure over that operating speed range to prevent belt slippage and assure precise changes in belt speed.

To provide these abilities, a tension spring is utilized to maintain a substantially constant side pressure on the pulley belt. The amount of side pressure applied can be adjustably varied to permit changes in the range of operating speeds and torque control.

DESCRIPTION OF THE PREFERRED EMBODIMENT

Figure 2:
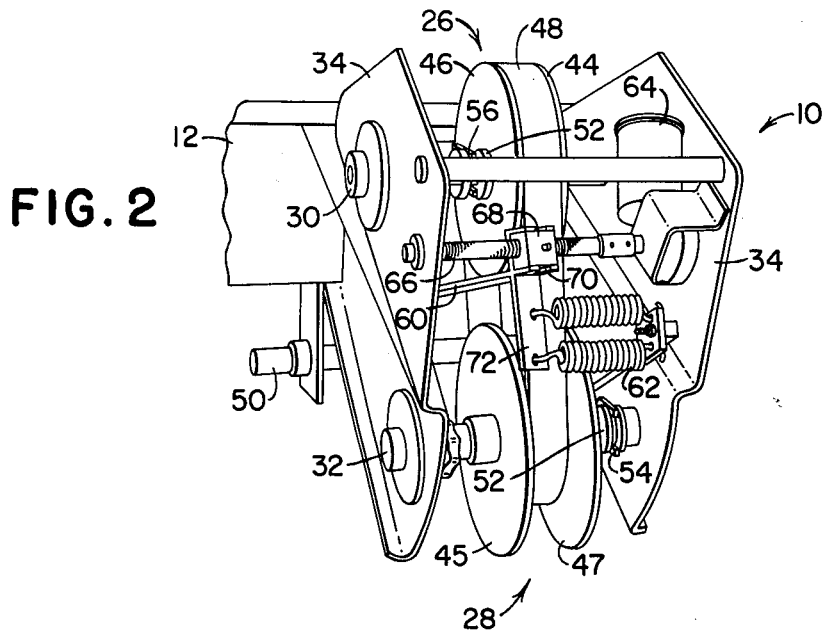
FIG. 2 is an enlarged view of the variable speed seed drive means.
Figure 1:
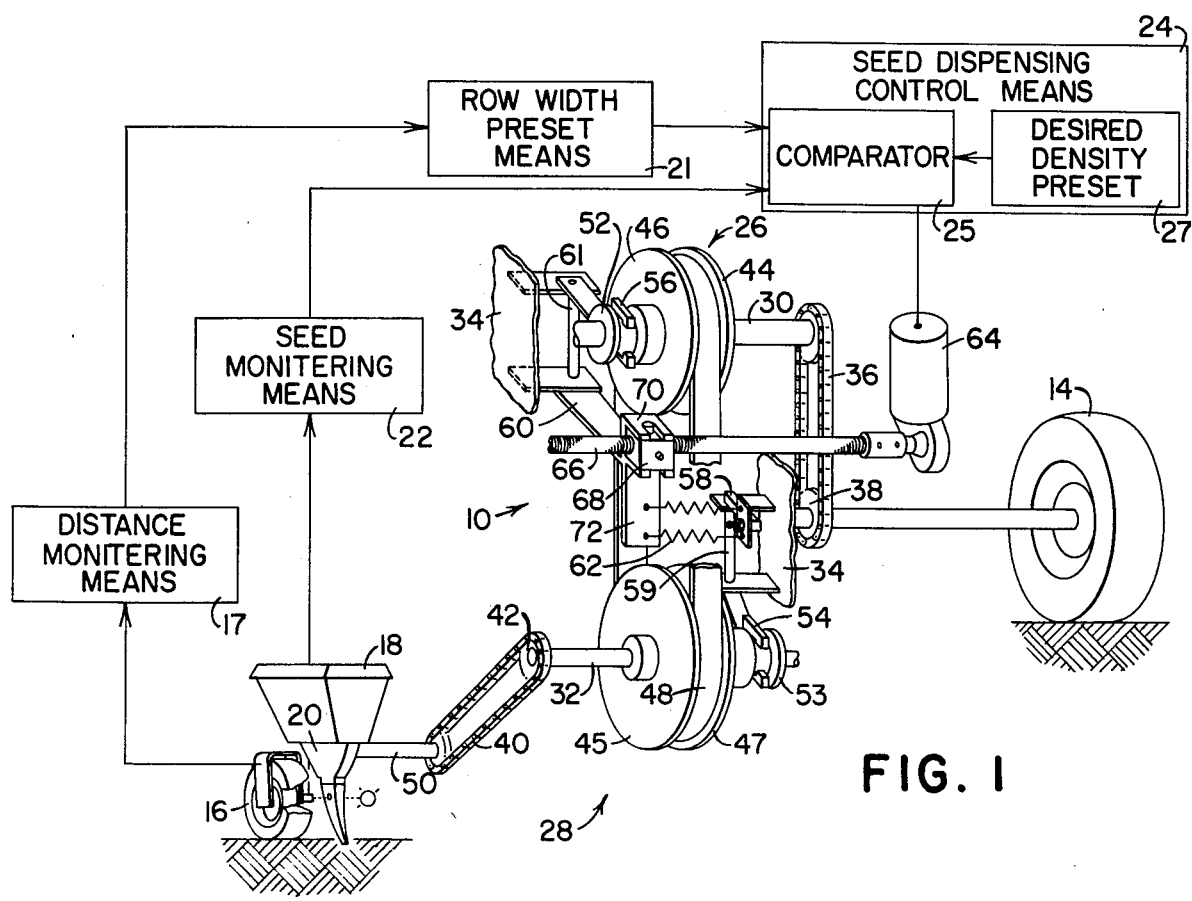
FIG. 1 is a schematic diagram illustrating the variable speed seed drive means and the planter components.

Referring now to the drawings and particularly to FIGS. 1 and 2, there is illustrated the variable speed seed drive 10 and the basic components of the planter necessary to provide a controlled population planter. Included are a mobile frame 12 adapted to be transported over the ground, a ground-engaging drive wheel 14, a ground-engaging distance measuring wheel 16, a means for measuring the distance traveled by the ground measuring wheels 17, a seed hopper 18, a seed dispensing means 20, a seed monitoring means 22 for determining the number of seeds dispensed, a row width preset means 21, a seed dispensing control means 24 including a comparator 25 and a desired density preset 27 and the variable speed seed dispensing drive means 10.

The improved variable speed seed drive means 10 is mounted on the mobile frame 12 and includes a pair of conically-shaped pulleys 26 and 28 nonrotatably mounted on respective shafts 30 and 32. The shaft 30 is mounted on the frame supports 34 and is coupled with the ground-engaging drive wheel 14 by the chain 36 and sprocket 38. The driven shaft 32 is also supported on frame supports 34 axially parallel with the drive shaft 30 and laterally spaced to the rear thereof. It is drivingly coupled through the chain 40 and sprocket 42 arrangement with the seed dispensing means 20. Each pulley 26 and 28 is mounted on its respective shaft in aligned and opposing relation with the other pulley and includes respective fixed disk sections 44 and 45 and respective movable disk sections 46 and 47. The movable disk sections 46, 47 are on opposite sides of the respective pulleys 26 and 28 and oppose the respective fixed disk sections 45, 44 of the other respective pulley 28, 26. An endless V-belt 48 is trained over and around the pulleys to transmit the power from the ground-engaging drive wheel 14 to the seed dispensing drive shaft 50.

Figure 3:
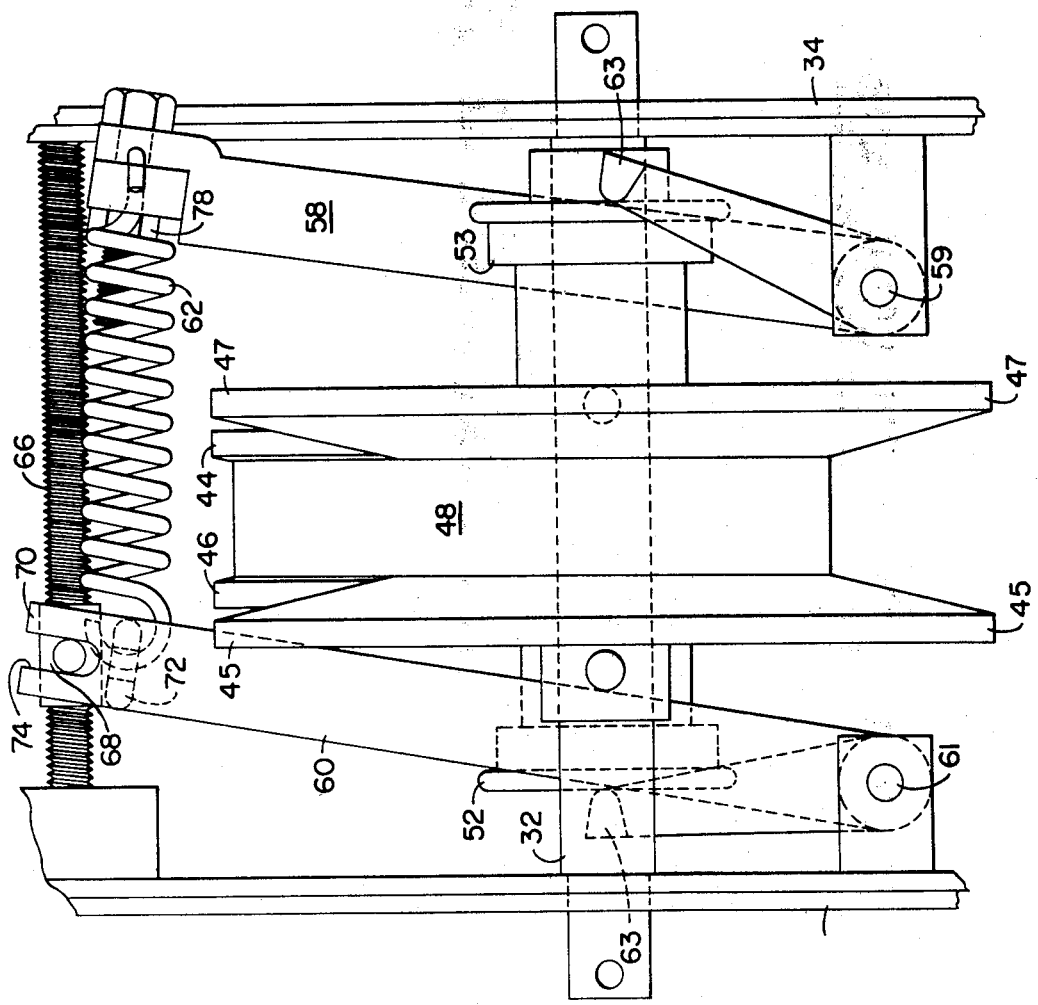
FIG. 3 is an enlarged plan view of a slightly modified pulley transmission.

Loosely encircling the upper and lower hubs 52, 53 of the movable disk sections 46, 47 are yoke members numbered 56 and 54 respectively. The yoke members 54 and 56 have their ends fixed on vertical rods 59 and 61 respectively which in turn are pivotally mounted on the frame support 34. Rigidly secured to the rods 59 and 61 are yoke control arms 58 and 60. Interconnecting the two yoke control arms 58 and 60 is a tension means or spring biasing means 62. In the modified version illustrated in FIG. 3, the shiftable pulley sheaves 46 and 47 are adjusted by the control arms 60 and 58 which carry abutment surfaces 63 that bear against the outer sides of the sheaves 46 and 47. Since the belt pressure on the pulley sheaves 46 and 47 tends to force them out, pressure need only be exerted inwardly to adjust the sheaves position.

To each yoke member 54 and 56 or abutment surface 63, is connected a means for shifting it through a limited arc about the vertical axis defined by the respective pivot rods 59 and 61. That means includes a reversible electric motor 64 which rotates a threaded shaft or screw 66 mounted on the frame supports 34. The screw 66 has external threads and is passed through internally threaded block 68 which is loosely coupled with the control arm 60. Since the arms 58 and 60 are pivotally anchored to their rods 59 and 61 and thus rotate through respective arcs, a lost motion or loose fitting connection 70 between the linearly moving block 68 and angularly moving arm 60 is required to permit relative movement of the parts as the screw is rotated. To minimize the length of the slot 74 required in the loose fitting connection 70, the control arms 58 and 60 are arranged nearly parallel, see FIG. 3, and the midpoint of the range of pulley adjustment is selected for positioning the control arm 60 nearly perpendicular to the thread 66.

Figure 4:
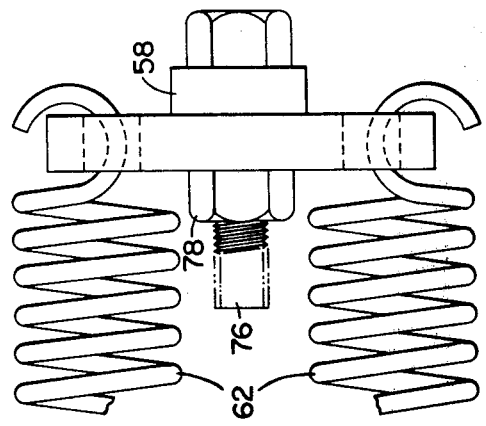
FIG. 4 is an enlarged view of a modified connection between the springs and yoke control arm.

The tension means 62 is connected between the connection 70 and control arm 58 to provide a constant tensioning force urging the disk section 46 against the belt 48. An adjustment screw 76, see FIG. 4, is provided between the springs 62 and control arm 58 to vary the tension preset on the springs 62 and thereby the force exerted by pulley sheave 47 against the belt 48.

In operation, a farmer first determines the desired density of seeds per unit area of ground to be planted. This is determined by the operator when he selects a desired seed spacing and row width. Prior to movement of the implement across the field, the desired seed density and row width figures will be entered onto the desired density preset 27 in the dispensing control means 24 and onto the row width preset means 21. Upon entry of these figures and upon beginning movement of the implement over the field, the ground-engaging wheel 14 will rotate the sprocket 38, chain 36 and drive shaft 30 and the V-belt 48 will be rotated to drive the driven shaft 32. The seed dispensing means 20 will be activated by drive shaft 50 and the seed monitoring means 22 will register the actual seeds dispensed. The control means 24 will receive signals from the seed monitoring means 22 corresponding to seeds actually dispensed, the row width preset means 21 corresponding to width between rows or planter units, the desired seed density preset means 27 corresponding to desired seed density and the distance measuring means 17 corresponding to the increment of distance traveled by the distance measuring wheel, and the comparator means 25 will compare the desired seed density for that particular row width and distance traveled with an actual seed dispense rate calculated. To substantially match the actual seed density with the desired seed density when variations occur, the variable speed pulley seed dispensing means drive must be adjusted. To adjust the drive, the control means 24 activates the electric motor 64 and the screw 66 is rotated to move the block 68 laterally. As the block 68 is moved, it shifts the control arm 60, the yoke member 56, the movable pulley section 46, and springs 62. The springs exert a force on the control arm 58 to then shift the yoke 54 and move the sheave 47. As the control arm 60 is shifted through an arc by the block 68, the substantially parallel control arm 58 is shifted by the springs 62 through the same approximate arc and the tension force exerted by the springs on the control arm 58 remains substantially constant for all relative positions of block 68 and control arm 60. Accordingly, the force exerted against the belt 48 will remain constant for all settings of the sheave 46 and the belt will transmit the torque and not incur slippage irrespective of the belt speed or positions of the sheaves 46, 47.

As the sheaves are adjusted by the block 68, the speed of the belt 48 will be changed to adjust the speed of seed meter drive shaft 50 and thereby the seed dispense rate.

Adjustment of the spring 62 tension can be effected if desired to change the force exerted on the belt 48. As best viewed in FIG. 4, this adjustment can easily be made by moving the nut 78 along the bolt 76.

Should one planter unit seed dispensing means malfunction and dispense too many or too few seeds, the seed monitoring means 22 will register the actual count and send the appropriate signal to the seed dispensing control means 24 which will compare the actual count with the desired density for that row width and distance traveled and accordingly drive the electric motor 64 and shift the movable pulley disk sections 46, 47 to either increase or decrease the speed of the variable speed transmission 10 and the seed dispensing drive shaft 50.

Because the ground-engaging wheel 14 directly drives the drive shaft 30, the variable drive means 10 will attain immediate seed monitoring ability upon movement of the planter across the field. With the driven shaft 32 operating in direct response to rotation of the drive shaft 30 as adjusted by the spacing between the pulleys 26 and 28, quick and precise changes in the rotation and speed of the driven shaft 32 and consequently the rotational speed of the seed dispensing drive shaft 50 can be realized. These changes are easily and quickly effected through the seed dispensing control means 24 as it receives planted seed density information from the monitoring means 22 and width preset means 21 and compares that information to the desired seed density for a particular distance traveled.

With the present invention a farmer can quickly, easily and accurately change and automatically maintain seed dispensing rates as his planter moves from good soil to poor or sandy soil and back again without loosing time to adjust or change equipment settings. In this way maximum yields from all soil types and conditions can be realized without incurring lost time or wasted seeds.

We claim:

1. In a planter having a main frame and at least two seed dispensing planter units carried thereon, the latter having a planter drive shaft; a ground-engaging distance measuring wheel carried on the frame and having a distance monitoring device associated therewith for producing an electrical signal; a seed monitoring device carried on each planter unit for producing an electrical signal indicative of the rate of seed discharge by the planter unit; a driven drive shaft; a belt drive between the drive shaft and planter shaft including an adjustable variable speed pulley means; a member rotatable in opposite directions and connected to the variable speed pulley means to open and close the latter in accordance with the direction of rotation of the member; a bidirectional electric motor drivingly connected to the rotatable member; a row width preset means for receiving signals from the distance monitoring device and for producing an electrical signal; and a seed dispensing control means for setting the desired seed density for said planter units, said control means including a comparator means for receiving signals from the seed monitoring device and the row width preset means and responsive to said signals to determine seed discharge density and to compare said discharge density to desired seed density to thereby pass an electrical signal to and for driving said electric motor in the direction necessary to make the monitored seed density substantially equal to the desired seed density.

2. In a planter having a main frame and a plurality of seed dispensing planter units carried thereon, each unit driven by a planter drive shaft; a ground-engaging distance measuring wheel carried on the frame and having a distance monitoring device associated therewith for producing an electrical signal; a seed monitoring device carried on each planter unit for producing an electrical signal indicative of the rate of seed discharge by the planter unit; a driven drive shaft; a belt drive between the drive shaft and planter shaft including a conical disk pulley rotatably carried on each shaft, one section of each pulley fixed to its respective shaft and the other section thereof slidable along said shaft, the movable sections being in offset and face to face relation and an endless belt operatively connecting the pulleys; a member rotatable in opposite directions and connected to one movable pulley section to open and close the latter in accordance with the direction of rotation of the member; a bidirectional electric motor drivingly connected to the rotatable member; a row width preset means for receiving signals from the distance monitoring device and for producing an electrical signal; and a seed dispensing control means including means for setting the desired seed density for said planter units, said control means further including a comparator means for receiving signals from the row width preset means, the means for setting desired seed density and each seed monitoring device and responsive to said signals to determine seed discharge density and compare said discharge density to desired seed density to thereby pass an electrical signal to and for driving said electric motor in the direction necessary to make the actual dispensed seed density substantially equal to the desired seed density.

3. In a planter, the combination including a mobile frame, a ground-engaging drive wheel supported on the frame, a ground-engaging measuring wheel supported on the frame, a seed hopper supported on the frame, a seed dispensing means associated with the hopper, a seed monitoring means including means for detecting seeds dispensed from the seed dispensing means and for generating a signal corresponding thereto, distance measuring means for measuring distance traveled by the ground measuring wheel, and for generating a signal corresponding thereto, and an improved variable speed transmission means drivingly coupled with the seed dispensing means comprising: a drive shaft carried by the frame and driven by the ground-engaging drive wheel; a driven shaft carried by the frame parallel with and in spaced relation to the driving shaft and drivingly coupled with the seed dispensing means; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt operatively connecting the pulleys; a shiftable yoke member coupled with each movable disk section; means for shifting one yoke member including a frame mounted reversible electric motor drivingly coupled with said one yoke member; row width preset means for receiving signals from the distance measuring means and for producing a signal; and a seed dispensing control means including means for presetting a desired seed density, and a comparator means, said control means coupled with the seed monitoring means, the row width preset means and electric motor and responsive to signals from said monitoring and preset means to determine the dispensed seed density and compare that density to the desired seed density and thereby drive the motor and shift the one yoke member to make dispensed seed density substantially equal to preset desired seed density.

4. The invention defined in claim 3 wherein the means for shifting one yoke member includes a threaded shaft carried by the frame generally normal to the yoke members and drivingly coupled with the electric motor, and means coupling said one yoke member with the threaded shaft, reciprocally shiftable along the latter upon rotation thereof to shift said yoke member.

5. The invention defined in claim 4 wherein the means coupling the yoke member with the threaded shaft includes a lost motion connection.

6. The invention defined in claim 4 wherein the means coupling the yoke member with the threaded shaft includes a yoke control arm rigidly secured with the yoke member and shiftably coupled with a reciprocable block carried by the threaded shaft.

7. In a planter, the combination including a mobile frame, a ground-engaging drive wheel supported on the frame, a ground-engaging measuring wheel supported on the frame, a seed hopper supported on the frame, a seed dispensing means associated with the hopper, a seed monitoring means including means for detecting seeds dispensed from the seed dispensing means and for generating a signal corresponding thereto, distance measuring means for measuring distance traveled by the ground measuring wheel and for generating a signal corresponding thereto, an improved variable speed transmission means drivingly coupled with the seed dispensing means comprising: a drive shaft carried by the frame and driven by the ground-engaging drive wheel; a driven shaft carried by the frame parallel with and in spaced relation to the driving shaft and drivingly coupled with the seed dispensing means; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt operatively connecting the pulleys; a pair of yoke members pivotally mounted on the frame, one member engaged with each movable disk section; a yoke control means connected with one yoke member; biasing means for urging one yoke member towards the other; means for shifting the disk sections linearly including an electric motor supported on the frame, a reversible screw drivingly coupled with the electric motor, and means connecting the screw with the yoke control means to move the yoke member upon rotation of the screw; a row width preset means for receiving signals from the distance measuring means and for producing a signal; and a seed dispensing control means including a means for presetting a desired seed density and a comparator means, said control means coupled with the seed monitoring means, the row width preset means and electric motor and responsive to signals from said monitoring means and row width preset means to determine dispensed seed density and compare said dispensed density to said desired seed density to thereby reversibly drive the motor to make the density of seeds dispensed substantially equal to the preset desired seed density.

8. In a planter, the combination including a mobile frame, a ground-engaging drive wheel supported on the frame, a ground-engaging measuring wheel supported on the frame, a seed hopper supported on the frame, a seed dispensing means associated with the hopper, a seed monitoring means including means for detecting seeds dispensed from the seed dispensing means and for generating a signal corresponding thereto, distance measuring means for measuring distance traveled by the ground measuring wheel and for generating a signal corresponding thereto, an improved variable speed transmission means drivingly coupled with the seed dispensing means comprising: a drive shaft carried by the frame and driven by the ground-engaging drive wheel; a driven shaft carried by the frame parallel with and in spaced relation to the driving shaft and drivingly coupled with the seed dispensing means; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt operatively connecting the pulleys; a pair of yoke members pivotally mounted on the frame, one member coupled with each movable disk section; a yoke control arm rigidly secured with each yoke member and shiftable through an arc about the pivotal mounting of its respective yoke member; means for shifting one control arm including an externally threaded shaft supported on the frame axially parallel with both the drive and driven shafts, reciprocable means carried by the shaft, a lost motion connection coupling the reciprocable means with the one control arm, a reversible electric motor supported by the frame and drivingly coupled with the threaded shaft; a row width preset means for receiving signals from the distance measuring means and for generating a signal and a seed dispensing control means including a means for presetting a desired seed density and a comparator means, said control means coupled with the seed monitoring means, the row width preset means and electric motor, and responsive to signals from said monitoring means and row width preset means to compare the density of seeds dispensed with the desired seed density and to reversibly drive the motor to make dispensed seed density substantially equal to preset desired seed density.

9. An improved infinitely variable cone pulley transmission means comprised of a frame mounted driving shaft and a driven shaft mounted in parallel spaced apart relation; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt member operatively connecting the pulleys; a yoke member coupled with each movable disk section; means pivotally mounting the yoke members on the frame for limited rotational movement; tension means interconnecting the pivotal mounting means; and means for shifting one pivotal mounting means including a frame supported electric motor drivingly coupled with the shifting means so as to move said yoke member laterally.

10. In a planter having a main frame and a plurality of seed dispensing planter units carried thereon, each unit driven by a planter drive shaft; a ground-engaging distance measuring wheel carried on the frame and having a distance monitoring device associated therewith for producing an electrical signal; a seed monitoring device carried on each planter unit for producing an electrical signal indicative of the rate of seed discharge by the planter unit; a driven drive shaft; a belt drive between the drive shaft and planter shaft including a conical disk pulley rotatably carried on each shaft, one section of each pulley fixed to its respective shaft and the other section thereof slidable along said shaft, the movable sections being in offset and face to face relation and an endless belt operatively connecting the pulleys; a member rotatable in opposite directions and connected to one movable pulley section to open and close the latter in accordance with the direction of rotation of the member; tension means connecting the other movable section to the one section for movement therewith and for exerting upon the former a generally constant force; a bidirectional electric motor drivingly connected to the rotatable member; a row width preset means for receiving signals from the distance monitoring device and for producing an electrical signal; and a seed dispensing control means including means for setting the desired seed density for said planter units, said control means further including a comparator means for receiving signals from the row width preset means, the means for setting desired seed density and each seed monitoring device and responsive to said signals to determine seed discharge density and compare said discharge density to desired seed density to thereby pass an electrical signal to and for driving said electric motor in the direction necessary to make the actual dispensed seed density substantially equal to the desired seed density.

11. In a planter, the combination including a mobile frame, a ground-engaging drive wheel supported on the frame, a ground-engaging measuring wheel supported on the frame, a seed hopper supported on the frame, a seed dispensing means associated with the hopper, a seed monitoring means including means for detecting seed dispensed from the seed dispensing means and for generating a signal corresponding thereto, distance measuring means for measuring distance traveled by the ground measuring wheel, and for generating a signal corresponding thereto, and an improved variable speed transmission means drivingly coupled with the seed dispensing means comprising: a drive shaft carried by the frame and driven by the ground-engaging drive wheel; a driven shaft carried by the frame parallel with and in spaced relation to the driving shaft and drivingly coupled with the seed dispensing means; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt operatively connecting the pulleys; a shiftable yoke member coupled with each movable disk section; means for shifting one yoke member including a frame mounted reversible electric motor drivingly coupled with said one yoke member; tension means between the shifting means and the other yoke member for moving the latter in unison with the one yoke member and for exerting upon the other yoke member a generally constant force; row width preset means for receiving signals from the distance measuring means and for producing a signal; and a seed dispensing control means including means for presetting a desired seed density, and a comparator means, said control means coupled with the seed monitoring means, the row width preset means and electric motor and responsive to signals from said monitoring and preset means to determine the dispensed seed density and compare that density to the desired seed density and thereby drive the motor and shift the one yoke member to make dispensed seed density substantially equal to preset desired seed density.

12. The invention described in claim 11 wherein there is further provided means to adjust the tension means and vary the force exerted upon the other yoke member.

13. In a planter, the combination including a mobile frame, a ground-engaging drive wheel supported on the frame, a ground-engaging measuring wheel supported on the frame, a seed hopper supported on the frame, a seed dispensing means associated with the hopper, a seed monitoring means including means for detecting seed dispensed from the seed dispensing means and for generating a signal corresponding thereto, distance measuring means for measuring distance traveled by the ground measuring wheel and for generating a signal corresponding thereto, an improved variable speed transmission means drivingly coupled with the seed dispensing means comprising: a drive shaft carried by the frame and driven by the ground-engaging drive wheel; a driven shaft carried by the frame parallel with and in spaced relation to the driving shaft and drivingly coupled with the seed dispensing means; a pulley nonrotatably mounted on each shaft, said pulleys aligned in opposing relation to each other, each pulley having conical disk sections with one disk section fixed on its respective shaft and one section movable thereon, each fixed section opposing the movable section of the other pulley; an endless belt operatively connecting the pulleys; a pair of yoke members pivotally mounted on the frame, one member coupled with each movable disk section; a yoke control arm rigidly secured with each yoke member and shiftable through an arc about the pivotal mounting of its respective yoke member; means for shifting one control arm including an externally threaded shaft supported on the frame axially parallel with both the drive and driven shafts, reciprocable means carried by the shaft, a lost motion connection coupling the reciprocable means with the one control arm, a reversible electric motor supported by the frame and drivingly coupled with the threaded shaft; tension means connecting the reciprocable means with the other control arm for movement in unison and for exerting upon said arm a constant force; a row width preset means for receiving signals from the distance measuring means and for generating a signal and a seed dispensing control means including a means for presetting a desired seed density and a comparator means, said control means coupled with the seed monitoring means, the row width preset means and electric motor, and responsive to signals from said monitoring and row width preset means to compare the density of seeds dispensed with the desired seed density and to reversibly drive the motor to make dispensed seed density substantially equal to preset desired seed density.

14. The invention described in claim 13 further provided with means to adjust the tension means and vary the force exerted upon the control arm.

* * * * *